US010778523B2

(12) United States Patent
Turner et al.

(10) Patent No.: US 10,778,523 B2
(45) Date of Patent: Sep. 15, 2020

(54) CONFIGURATION SETTINGS MANAGEMENT IN A NETWORK ENVIRONMENT

(71) Applicant: Time Warner Cable Enterprises LLC, St. Louis, MO (US)

(72) Inventors: Christopher G. Turner, Leesburg, VA (US); Andrew C. Danforth, Chantilly, VA (US)

(73) Assignee: Time Warner Cable Enterprises LLC, St. Louis, MO (US)

( * ) Notice: Subject to any disclaimer, the term of this patent is extended or adjusted under 35 U.S.C. 154(b) by 1272 days.

(21) Appl. No.: 14/626,007

(22) Filed: Feb. 19, 2015

(65) Prior Publication Data
US 2016/0248633 A1    Aug. 25, 2016

(51) Int. Cl.
*H04L 12/24* (2006.01)
*H04W 56/00* (2009.01)

(52) U.S. Cl.
CPC ...... *H04L 41/0846* (2013.01); *H04L 41/0813* (2013.01); *H04W 56/001* (2013.01)

(58) Field of Classification Search
CPC ........... H04L 41/0813; H04L 41/0846; H04W 56/001
See application file for complete search history.

(56) References Cited

U.S. PATENT DOCUMENTS

| 8,655,993 | B1* | 2/2014 | Mixter | H04L 63/126 |
| | | | | 709/220 |
| 9,143,400 | B1* | 9/2015 | Roskind | H04L 41/0896 |
| 9,197,671 | B1* | 11/2015 | Bartoszewski | H04L 41/0813 |
| 2003/0208622 | A1* | 11/2003 | Mosier | H04L 41/022 |
| | | | | 709/244 |
| 2004/0121764 | A1* | 6/2004 | Rivero | H04W 28/18 |
| | | | | 455/418 |
| 2005/0144528 | A1* | 6/2005 | Bucher | G06F 9/44505 |
| | | | | 714/38.14 |
| 2010/0138900 | A1* | 6/2010 | Peterka | H04L 12/2812 |
| | | | | 726/4 |
| 2010/0306485 | A1* | 12/2010 | Dubhashi | G06F 21/10 |
| | | | | 711/162 |

(Continued)

Primary Examiner — Joe Chacko
(74) Attorney, Agent, or Firm — Armis IP Law, LLC

(57) ABSTRACT

A configuration resource automatically synchronizes configuration settings associated with one or more communication resources disposed in a respective subscriber domain. For example, a communication resource such as communication device operated by the subscriber initiates a change to configuration settings associated with a first communication resource disposed in a subscriber domain. The first communication resource notifies the auto-configuration resource of the new configuration settings applied to the first communication resource. The auto-configuration resource identifies one or more other communication resources disposed in the subscriber domain. To ensure synchronization of the communication resources in the subscriber domain, in response to receiving notification of the new configuration settings applied to at least one communication resource and the subscriber domain, the auto-configuration resource initiates modification of configuration settings associated with the one or more other communication resources in the subscriber domain.

34 Claims, 10 Drawing Sheets

(56) References Cited

U.S. PATENT DOCUMENTS

| | | | | |
|---|---|---|---|---|
| 2012/0239791 A1* | 9/2012 | Takamoto | ............... | G06F 3/12 |
| | | | | 709/222 |
| 2012/0287817 A1* | 11/2012 | Yamaguchi | ......... | H04L 41/0853 |
| | | | | 370/254 |
| 2015/0109909 A1* | 4/2015 | Yeddala | ............... | H04W 48/04 |
| | | | | 370/230 |

* cited by examiner

| SUBSCRIBER DOMAIN | SUBSCRIBER ADDRESS | HOH SUBSCRIBER USER | ACCOUNT NUMBER | SUBSCRIPTION SERVICES | CONFIG. INFO. |
|---|---|---|---|---|---|
| 150-1 | LOCATION #1 | 108-1 | 15523456-12 | A, B, D, E | 170-1 |
| 150-2 | LOCATION #2 | 108-2 | 15522677-17 | A, B | 170-2 |
| 150-3 | LOCATION #3 | 108-3 | 15443456-12 | A, B, D, E | 170-3 |
| 150-4 | LOCATION #4 | 108-4 | 36773566-14 | A, B, D | 170-4 |
| ... | ... | ... | ... | ... | ... |

SUBSCRIBER INFO. 160

FIG. 2

CONFIGURATION SETTINGS MANAGEMENT IN A NETWORK ENVIRONMENT

BACKGROUND

Conventional home wireless networks typically include multiple communication resources (such as one or more WiFi™ base stations) facilitating wireless communications with one or more mobile communication devices. For example, a conventional wireless network may include: a first base station providing wireless coverage to a first region in a home environment; a second base station providing wireless coverage to a second region in the home environment; etc.

Each of the wireless base stations may be part of the same wireless network providing access to a corresponding remote network such as the Internet. Via communications through a selected one of the multiple base stations, a respective user of the mobile communication device in the home environment is able to wirelessly communicate over the Internet. In certain instances, the wireless base stations may support handoffs from one base station to another. This typically requires settings of the wireless base stations to be synchronized to some extent.

Each of the multiple wireless base stations disposed in a respective network can be configured in a similar manner with the same or complementary configuration settings such that a user in the home environment is able to connect to any of the multiple wireless base stations to access the Internet using a corresponding mobile device. Operating a wireless network using appropriate synchronized configuration settings amongst the base station enables the respective user to more easily use any of the base stations in the wireless network. As mentioned, synchronization of settings is typically required to support handoffs.

For any number of reasons, a head of household user may modify configuration settings (such as an SSID, password, security mode, channel settings, radio settings, network address information, etc.) associated with the wireless network and corresponding base stations.

As a specific example, assume that a respective user would like to make a change to a configuration setting such as the name assigned to the wireless network and corresponding wireless base stations. Initially, assume that both the first base station and a second base station in the wireless network are assigned the same SSID (Service Set IDdentifier) value and reside within the same wireless network. In general, an SSID value is a multi-bit character string indicating a name assigned to a respective base station in the wireless network.

To learn of the name assigned to the wireless network, the user of a respective mobile device may initiate transmission of a discovery request to any of one or more base stations within wireless range. In response to receiving the discovery request, each of one or more base stations that receives the discovery request responds (such as via broadcast) with a respective SSID value indicating the name assigned to the base station in the wireless network.

According to conventional techniques, the name of the wireless network can be changed. In order to modify the name assigned to the wireless network and each of the base stations according to conventional techniques, the respective subscriber in the subscriber domain must manually modify the respective name assigned to each of the base stations. For example, the user must first manually initiate changing the SSID value associated with the first base station to a selected new name. Thereafter, in order to ensure synchronization of wireless network settings, the user must manually change the SSID value associated with the second base station to the selected new name as well.

In accordance with certain other conventional systems, wireless access points in a respective wireless network communicate with each other to update configuration settings. However, this technique is not secure and prone to attacks by hackers.

Regardless of how the name of wireless network is changed, after effectuating the change of both base station SSID values to the common selected new name, the user is able to connect to any of the base stations using a common setting. For example, the user can program a respective mobile communication device to connect with any wireless base station assigned the new name. In such an instance, when a user requests to establish a wireless connection with the wireless network, the mobile communication device automatically establishes the wireless connection with the network using a suitable one of multiple base stations assigned the new name.

BRIEF DESCRIPTION OF EMBODIMENTS

Conventional techniques of synchronizing configuration settings across multiple communication resources in a wireless network suffer from deficiencies. For example, the requirement of having to manually modify settings associated with each of multiple resources is time-consuming and prone to errors.

Embodiments herein deviate with respect to conventional techniques to provide a more useful way of synchronizing configuration settings in a respective network environment.

More specifically, in accordance with one example embodiment, a configuration server resource receives input (such as one or more communications, messages, etc.) transmitted through a communication interface (such as a cable modem) of a subscriber domain. Assume in this example that the received input indicates modification of a configuration setting associated with a first wireless access point (i.e., a first communication resource) disposed in the subscriber domain. In one embodiment, the configuration server resource registers (keeps tack of) the configuration setting as being associated with the first wireless access point in the subscriber domain. Additionally, the configuration server resource identifies an identity of a second wireless access point (i.e., a second communication resource) associated with the first wireless access point that happens to be disposed in the subscriber domain. Thereafter, to synchronize settings of the first wireless access point and the second wireless access point, the configuration server resource initiates configuration of the second wireless access point in accordance with the configuration setting applied to the first wireless access point and the subscriber domain.

Thus, embodiments herein include modifying configuration settings associated with a second communication resource in response to detecting a change to configuration settings associated with a first communication resource.

In one embodiment, initiating configuration of the second wireless access point can include communicating new configuration settings from the configuration server resource to the second wireless access point. In this manner, a configuration setting applied by a user in the subscriber domain to configure a first wireless access point can be used to automatically configure a second wireless access point.

In accordance with further embodiments, the configuration server resource (such as management server operated by a cable network service provider) is disposed at a remote location with respect to the subscriber domain. The configuration server resource manages configuration settings associated with each of multiple subscriber domains. Configuration of the second wireless access point in the above example can include transmitting the newly learned configuration setting (detected as being applied to the first wireless access point) from the configuration server resource over a network and through the communication interface in the subscriber domain to the second wireless access point (which also resides in the subscriber domain). In other words, assigning the configuration setting to the second wireless access point can include transmitting an update command over the shared communication link in a cable network through the communication interface of the subscriber domain to the second wireless access point. The second wireless access point uses the received update command to synchronize its settings with the settings applied to the first wireless access point. Accordingly, in response to receiving notification that a first communication resource has been configured to a new setting, the configuration server resource as discussed herein automatically updates configuration settings associated with a second communication resource in a subscriber domain.

Note that the configuration setting applied to the first wireless access point can be any suitable type of configuration information. For example, the configuration setting as indicated by received input can specify a specific setting or any type of attribute such as an SSID, password information, security mode information, channel setting information, etc.

In yet further embodiments, any number of wireless access points such as both the first wireless access point and the second wireless access point communicate through the communication interface of the subscriber domain to provide mobile communication devices in the subscriber domain access to a remote network through a shared communication link (such as a shared communication link provided by a cable network service provider). The configuration server resource can be configured to keep track of which communication resources are in a respective subscriber domain based upon detecting which of the communication resources communicate through the same communication interface and the subscriber domain. Embodiments herein include automatically updating configuration settings associated with each of the wireless access points in the subscriber domain in response to detecting a change of configuration settings to only one of the communication resources in a respective subscriber domain.

In accordance with further embodiments, to synchronize settings in a respective subscriber domain, the configuration server resource can be configured to map an identity of a first wireless access point (whose settings are changed) to a second wireless access point (or possibly other access points) in the subscriber domain. The mapping function can be achieved in any suitable manner. For example, the configuration server resource can be further configured to process a received input message originating from the subscriber domain to identify network address information associated with the specific subscriber domain from which the input message is received.

As a more specific example, in one embodiment, the configuration server resource utilizes the network address information associated with a message originating from the subscriber domain to identify that the message was transmitted (such as from the first wireless access point) through the communication interface of the subscriber domain to the configuration server resource. Using the network address information or other suitable unique identifier value or information in the communications received from the subscriber domain, the configuration server resource accesses subscriber information and/or configuration information associated with the subscriber domain. The configuration information indicates that the second wireless access point is also disposed in the subscriber domain. Accordingly, via the input message received from the subscriber domain, the configuration server resource is able to identify any of one or more additional wireless access points in the subscriber domain. As previously discussed, subsequent to identifying one or more other communication resources to be updated in accordance with newly applied configuration settings to a specific communication resource in the subscriber domain, the configuration server resource communicates with the one or more additional wireless access points to synchronize them with settings of the first wireless access point.

In one example embodiment, to initiate configuration of the second wireless access point based on the newly detected settings as specified by the received message, the configuration server resource transmits a communication over the shared communication link through the communication interface of the subscriber domain to the second wireless access point. The communication from the configuration server resource includes the configuration setting to be applied to the second wireless access point. In one embodiment, the communication indicates to configure the second wireless access point using the same configuration setting as was applied to the first wireless access point.

In accordance with yet further embodiments, it is not required that the message indicating a configuration setting (for application to one more resources) be received from a respective wireless access point in the subscriber domain. For example, in one embodiment, the configuration server resource receives a configuration message (including a specified configuration setting) from a web browser executing on a computer device operated by a user in the subscriber domain. The web browser can be in communication with the communication interface over a communication link other than through the first wireless access point to the second wireless access point.

As previously discussed, the configuration server resource can be configured to learn of the presence of one or more communication resources in the subscriber domain in any suitable manner. In one non-limiting example embodiment, the configuration server resource detects presence of a first wireless access point in the subscriber domain based upon receipt of communications transmitted from the first wireless access point through the communication interface. The configuration server resource detects presence of a second wireless access point in the subscriber domain based upon receipt of communications transmitted from the second wireless access point through the communication interface. As previously discussed, configuration server resource is able to inspect communications transmitted through the communication interface of the subscriber domain to identify that such communications originated from the subscriber domain.

These and other more specific embodiments are disclosed in more detail below.

Note that any of the resources as discussed herein can include one or more computerized devices, controllers, set top boxes, servers, base stations, wireless communication equipment, communication management systems, workstations, handheld or laptop computers, or the like to carry out and/or support any or all of the method operations disclosed herein. In other words, one or more computerized devices or processors can be programmed and/or configured to operate as explained herein to carry out different embodiments of the invention.

Yet other embodiments herein include software programs to perform the steps and operations summarized above and disclosed in detail below. One such embodiment comprises a computer program product including a non-transitory computer-readable storage medium (i.e., any physical computer readable hardware storage medium) on which software instructions are encoded for subsequent execution. The instructions, when executed in a computerized device (e.g., computer processing hardware) having a processor, program and/or cause the processor to perform the operations disclosed herein. Such arrangements are typically provided as software, code, instructions, and/or other data (e.g., data structures) arranged or encoded on a non-transitory computer readable storage medium such as an optical medium (e.g., CD-ROM), floppy disk, hard disk, memory stick, etc., or other a medium such as firmware in one or more ROM, RAM, PROM, etc., or as an Application Specific Integrated Circuit (ASIC), etc. The software or firmware or other such configurations can be installed onto a computerized device to cause the computerized device to perform the techniques explained herein.

Accordingly, embodiments herein are directed to a method, system, computer program product, etc., that supports operations as discussed herein.

One or more embodiments herein include a computer readable storage medium and/or system having instructions stored thereon. In accordance with one embodiment, the instructions, when executed by computer processor hardware, cause the computer processor hardware (such as in a mobile computer device) to: receive a communication indicating a new configuration setting, the communication received from a particular subscriber domain over a communication link shared by multiple subscriber domains; access subscriber information assigned to the particular subscriber domain to identify that the particular subscriber domain includes a first communication resource and a second communication resource; and synchronize configuration settings of the first communication resource and the second communication resource in accordance with the received new configuration setting.

Another embodiment herein includes a computer readable storage medium and/or system having instructions stored thereon. The instructions, when executed by computer processor hardware, cause the computer processor hardware to: receive a communication transmitted through a communication interface of a subscriber domain, the communication indicating modification of a configuration setting associated with a first wireless access point disposed in the subscriber domain; map an identity of the first wireless access point to an identity of a second wireless access point also disposed in the subscriber domain; and initiate configuration of the second wireless access point in accordance with the configuration setting.

The ordering of the operations above has been added for clarity sake. Note that any of the processing steps as discussed herein can be performed in any suitable order.

Other embodiments of the present disclosure include software programs and/or respective hardware to perform any of the method embodiment steps and operations summarized above and disclosed in detail below.

It is to be understood that the system, method, apparatus, instructions on computer readable storage media, etc., as discussed herein also can be embodied strictly as a software program, firmware, as a hybrid of software, hardware and/or firmware, or as hardware alone such as within a processor, or within an operating system or a within a software application.

As further discussed herein, techniques herein are well suited to automatically update network configuration settings associated with communication resources disposed in a respective subscriber domain. However, it should be noted that embodiments herein are not limited to use in such applications and that the techniques discussed herein are well suited for other applications as well.

Additionally, note that although each of the different features, techniques, configurations, etc., herein may be discussed in different places of this disclosure, it is intended, where suitable, that each of the concepts can optionally be executed independently of each other or in combination with each other. Accordingly, the one or more present inventions as described herein can be embodied and viewed in many different ways.

Also, note that this preliminary discussion of embodiments herein purposefully does not specify every embodiment and/or incrementally novel aspect of the present disclosure or claimed invention(s). Instead, this brief description only presents general embodiments and corresponding points of novelty over conventional techniques. For additional details and/or possible perspectives (permutations) of the invention(s), the reader is directed to the Detailed Description section and corresponding figures of the present disclosure as further discussed below.

BRIEF DESCRIPTION OF THE DRAWINGS

FIG. 2 is an example diagram of subscriber information according to embodiments herein.

Figure 1:
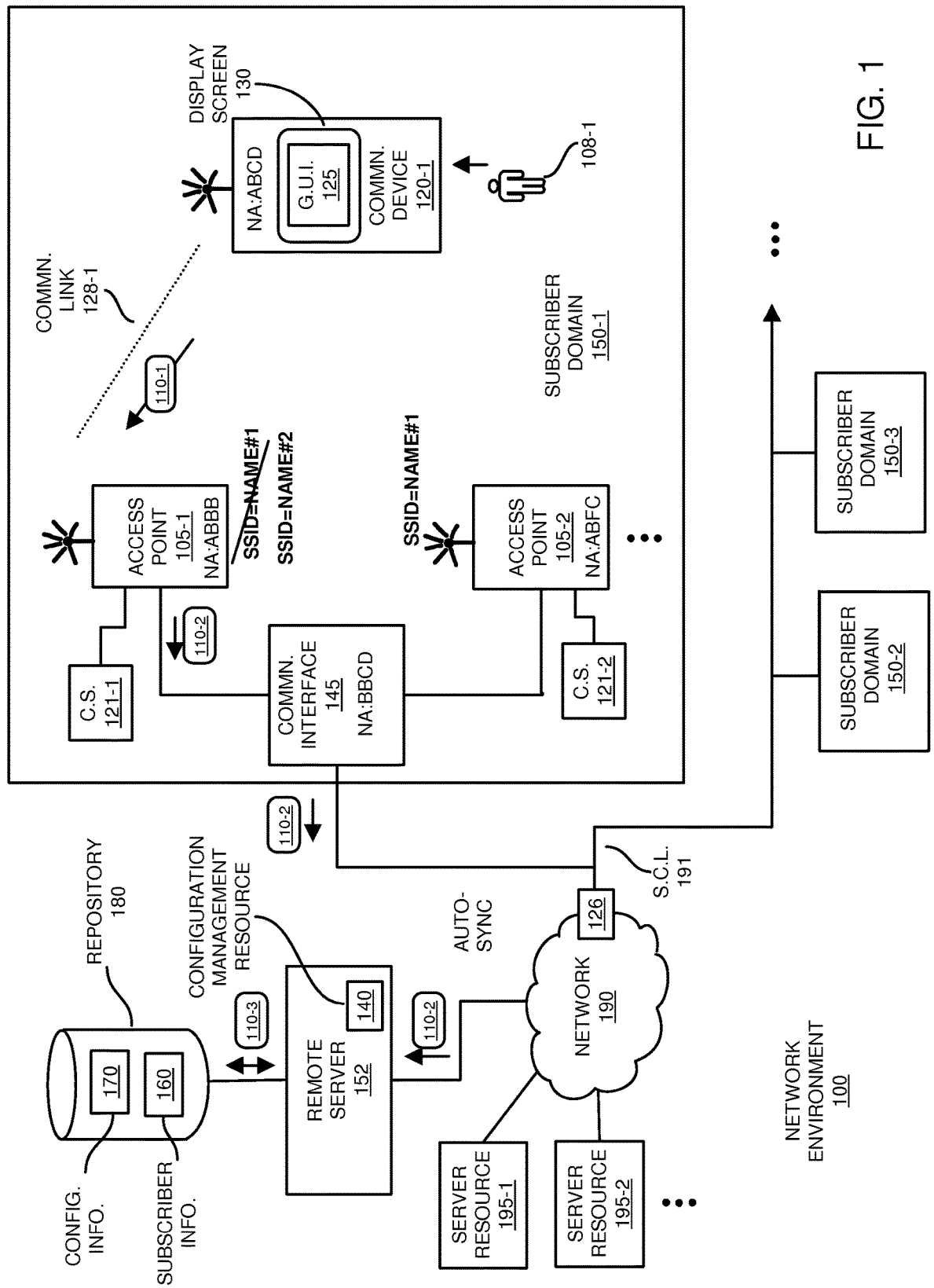
FIG. 1 is an example diagram illustrating a network environment and auto-synchronization of configuration settings according to embodiments herein.

The foregoing and other objects, features, and advantages of the invention will be apparent from the following more particular description of preferred embodiments herein, as illustrated in the accompanying drawings in which like reference characters refer to the same parts throughout the different views. The drawings are not necessarily to scale, with emphasis instead being placed upon illustrating the embodiments, principles, concepts, etc.

DETAILED DESCRIPTION AND FURTHER SUMMARY OF EMBODIMENTS

In general, a configuration resource synchronizes configuration settings associated with one or more communication resources disposed in a respective subscriber domain. For example, a communication device operated by the subscriber initiates a change to configuration settings associated with a first communication resource disposed in a subscriber domain. The first communication resource (or other suitable resource) notifies the configuration resource of the new configuration settings applied to the first communication resource in the subscriber domain. The configuration resource identifies one or more other communication resources associated with the first communication resource that are also disposed in the subscriber domain. To ensure synchronization of the communication resources in the subscriber domain, in response to receiving notification of the new configuration settings applied to at least one communication resource (such as the first communication resource), the configuration resource initiates modification of configuration settings associated with the identified one or more other communication resources associated with the first communication resource in the subscriber domain.

Now, more specifically, FIG. 1 is an example diagram illustrating a network environment according to embodiments herein.

As shown, network environment 100 includes shared communication link 191 provided and managed by a respective cable network service provider. Via communications over shared communication link 191, each of multiple subscriber domains 150 (subscriber domain 150-1, subscriber domain 150-2, subscriber domain 150-3, etc.) are able to transmit data to and receive data from network 190 such as the Internet. In one embodiment, bandwidth of the shared communication link 191 and corresponding data channels are allocated for use by the different subscriber domains 150 on an as needed basis.

Further in this example embodiment, subscriber domain 150-1 includes communication interface 145 (such as part of a gateway resource) assigned a corresponding unique network address information BBCD. By way of non-limiting example embodiment, the communication interface 145 can be a cable modem facilitating communications over one or more appropriate data channels of shared communication link 191 to distribution resource 126 (such as a cable modem termination system).

Subscriber domain 150-1 includes any number of communication resources such as wireless access point 105-1, wireless access point 105-2, etc.

Each of the wireless access points 105 (communication resources) is communicatively coupled (via a wireless or wired communication link) to communication interface 145. As previously discussed, communication interface 145 facilitates communications over shared communication link 191 to network 190. Each of the first wireless access point 105-1 and the second wireless access point 105-2 provide mobile or stationary communication devices in the subscriber domain 150-1 wireless access to network 190 through the communication interface 145.

In one embodiment, the wireless access points 105 support wireless communications with one or more mobile communication devices in subscriber domain 150-1 in accordance with WiFi™ protocol. However, any suitable wireless protocol can be used to support communications between devices in subscriber domain and the respective wireless access points 105.

When transmitting communications from subscriber domain 150-1 in an upstream direction of the network environment 100, if desired, the communication interface 145 can be configured to encapsulate data packets received from any of the resources in subscriber domain 150-1 prior to transmitting such data packets over shared communication link 191 upstream to distribution resource 126 (such as a cable modem termination system). For example, in one embodiment, the communication interface 145 (such as employing cable modem functionality) wraps or encapsulates the data packets with delivery information facilitating a transfer of the data packets over communication link 191 to the upstream distribution resource 126. The upstream distribution resource 126 removes the delivery information (encapsulation information) and further forwards the unwrapped data packets over network 190 (such as a packet-switched network). The network 190 such as the Internet facilitates distribution of the data packets to appropriate destination addresses such as to any of one or more servers (such as server resource 195-1, server resource 195-2, remote server 152, etc.) based on destination information specified in the data packets.

In an opposite direction, communication interface 145 can receive downstream-transmitted communications from one or more remote resources (such as server resource 195-1, server resource 195-2, remote server 152, etc.) in network 190 over the shared communication link 191. The communication interface 145 forwards the downstream communications to an appropriate wireless access point such as wireless access point 105-1, that, in turn, distributes the communications to the appropriate mobile communication device in subscriber domain 150-1 over a respective communication link such as communication link 128-1.

In one embodiment, the distribution resource 126 can be configured to encapsulate communications received from network 190 and transmit corresponding encapsulated data packets to the communication interface 145. For example, the distribution resource 126 can receive a data packet addressed for delivery to a specific communication device in subscriber domain 150-1. In such an instance, the distribution resource 126 encapsulates the data packet with delivery information for delivery of the data packet over the shared communication link 191 to communication interface 145. The communication interface 145 receives the data packet and removes the delivery (encapsulation) information and forwards the respective unwrapped data packet downstream to wireless access point 105-1 for subsequent delivery over a corresponding wireless communication link 128-1 to the target device such as mobile communication device 120-1, wireless access point 105-1, wireless access point 105-2, etc.

Note that as an alternative to encapsulating data packets, note that the communication interface 145, shared communication link 191, and distribution resource 126, etc., can be configured to support routing of data packets in accordance with any suitable client/server communication protocol.

Network environment 100 further includes remote server 152 executing configuration management resource 140. Configuration management resource 140 has access to configuration information 170 associated with each of the subscriber domains 150. As further discussed below, the configuration information 170 can be configured to determine a configuration of each of the respective subscriber domains 150.

In accordance with further embodiments, the configuration information 170 can indicate settings of the multiple subscriber domains 150. The settings as specified by configuration information 170 can be updated any suitable manner. In one embodiment, the configuration management resource 140 detects presence of the different communication resources in the subscriber domain 150-1 based on communications transmitted through the communication interface 145. For example, in one embodiment, upon installation of a respective communication resource in subscriber domain 150-1, the respective communication resource communicates through communication interface 145 to the configuration management resource 140. In such an instance, the configuration management resource 140 detects presence of the first wireless access point 105-1 in the subscriber domain 150-1 based upon receipt of such communications. The configuration management resource 140 updates the configuration information 170 to indicate that the respective communication resource is operated in subscriber domain 150-1.

In one embodiment, the configuration manager resource 140 detects presence of the first wireless access point 105-1 based on communications transmitted from the first wireless access point through the communication interface 145 to the configuration management resource 140; the configuration management resource 140 detects presence of the second wireless access point 105-2 in the subscriber domain 150-1 based upon receipt of communications transmitted from the second wireless access point 105-2 through the communication interface 145 to the configuration management resource 140; etc.

As discussed herein, the configuration management resource 140 can be configured to determine which of the multiple subscriber domains 150 the communications are transmitted from based on analysis of the received communications. In one embodiment, communications transmitted from a particular communication resource in the subscriber domain 150-1 will include unique information (such as network address information) indicating that the communications originated from the particular communication resource. Additionally, communications received from subscriber domain 150-1 can include unique information indicating that the communications were transmitted through the respective communication interface 145.

In one embodiment, the configuration management resource 140 obtains network address information from the received communications 110-2. The configuration management resource 140 utilizes the network address information to identify that the communications 110-2 are received from the particular subscriber domain 150-1.

As previously discussed, embodiments herein include proactively synchronizing configuration settings associated with a group of two or more communication resources in the subscriber domain 150-1 such that a respective user 108 need not manually change settings to each of the two or more communication resources in the group.

As a more specific example, assume that the user 108-1 operates mobile communication device 120-1 in subscriber domain 150-1. Mobile communication device 120-1 includes display screen 130 configured to display graphical user interface 125. The graphical user interface 125 can be used to display any suitable information to the user 108-1. Via input to mobile communication device 120-1, the respective user 108-1 is able to modify configuration settings associated with any of one or more resources located in subscriber domain 150.

Assume further in this example that subscriber domain 150-1 includes multiple access points 105 (wireless access point 105-1, wireless access point 105-2, etc.) as previously discussed. Initially, each of the wireless access points 105-1 and 105-2 is included in a wireless network assigned a first name such as NAME #1. In such an instance, each of the wireless access points 105-1 and 105-2 has an SSID equal to NAME#1.

In one embodiment, wireless access point 105-1 supports communications with resources within a first region of wireless coverage; wireless access point 105-2 supports communications with resources within a second region of wireless coverage; and so on.

In certain instances, the regions of wireless coverage may overlap such that wireless connections can be handed off from one wireless access point to another as a respective user and corresponding communication resource roam through the subscriber domain 150-1.

Because both wireless access points 105-1 and wireless access point 105-2 are part of the same wireless network in this example, prior to a name change, the user 108-1 operating communication device 120-1 is able to specify that the communication device 120-1 is to be connected to the wireless network named NAME #1. As further discussed below, the communication device 120-1 can be configured to detect presence of the multiple wireless access points 105 that are part of the network named NAME #1. The communication device 120-1 selects which of the multiple access points 105 in the network named NAME #1 to establish a respective wireless link.

As a more specific example, via one or more wireless signals transmitted by the wireless access point 105-1 wireless access point 105-2, the communication device 120-1 is able to detect which of the wireless access points provides a strongest signal strength. If desired, the communication device 120-1 is able to select which of the wireless access points 105 to establish a wireless communication link based on signal strength.

Further in this example embodiment, assume that the user 108-1 operating communication device 120-1 provides input to change configuration settings 121-1 associated with wireless access point 105-1 (a first communication resource). Further assume in this example embodiment that the user 108-1 modifies a respective name assigned to the wireless access point 105-1. Specifically, assume that via communications 110-1, the user 108-1 changes the SSID associated with wireless access point 105-1 from NAME #1 to NAME #2.

The wireless access point 105-1 receives the communications 110-1 indicating to update the configuration settings 121-1. In response to receiving the instructions as specified by communications 110-1, the wireless access point 105-1 updates configuration settings 121-1 to reflect the new name, i.e., NAME #2. In addition to modifying the (SSID) name associated with the wireless access point 105-1, a notification application executing in the wireless access point 105-1 generates communications 110-2. Via notifications 110-2, the wireless access point 105-1 notifies the configuration management resource 140 executing on remote server 152 that the respective configuration settings 121-1 associated with wireless access point 105-1 have been changed via input from user 108-1. The communication interface 145 receives the communications 110-2 generated by wireless access point 105-1. The communication interface 145 forwards the communications 110-2 upstream over shared communication link 191 to distribution resource 126.

As previously discussed, when forwarding communications 110-2, communication interface 145 can be configured to transform (add a wrapper, add a network address associated with the communication interface 145, etc.) the originally received communications 110-2 for transmission over shared communication link 191 to distribution resource 126. In turn, distribution resource 126 further forwards the communications 110-2 to configuration management resource 140 in remote server 152.

In one embodiment, the communications 110-2 includes information such as: i) network address information assigned to the wireless access point 105-1 whose corresponding configuration settings 121-1 have been changed, ii) the specific changes made to configuration settings 121-1, iii) the model information of the wireless access point 105-1, iv) corresponding unique network address information assigned to the subscriber domain 150-1, etc.

In one embodiment, unique information in the communications 110-2 received by the configuration management resource 140 indicates that the particular subscriber domain from which the communications are transmitted. For example, the configuration management resource 140 is able to detect, via processing of received communications, which communication interface (communication interface 145 in this example) and corresponding subscriber domain 150-1 from which the respective communications are transmitted.

In this example embodiment, the unique network address information or other suitable information in the received communications 110-2 indicates that the communications 110-2 originated from a communication resource disposed in the subscriber domain 150-1.

During operation, the configuration management resource 140 processes the received communications 110-2 to identify that the communications 110-2 originated from subscriber domain 150-1. In other words, the configuration management resource 140 analyzes the received communications 110-2 (such as one or more messages) to identify a particular subscriber domain (such as subscriber domain 150-1) amongst the multiple subscriber domains 150 from which the message originated.

In addition processing the communications 110-2 and identifying that the communications 110-2 originated from a respective resource and subscriber domain 150-1, the configuration management resource 140 processes the received communications 110-2 and identifies that there was a change to configuration settings 121-1. In other words, as previously discussed, the communications 110-2 indicate that there was a change to configuration settings 121-1.

In response to detecting the change to configuration settings 121-1 as specified by the communications 110-2, via communications 110-3, the configuration management resource 140 accesses subscriber information 160 and configuration information 170 in repository 180 to identify whether one or more additional communication resource in the subscriber domain 150-1 should be updated with the new configuration settings as specified by the communications 110-2.

As previously discussed, this non-limiting example embodiment, the new configuration settings in the received communications 110-2 specifies that the user 108-1 or other suitable resource changed the SSID name of wireless access point 105-1 from NAME #1 to NAME #2. As further discussed below, the configuration management resource 140 initiates updating of at least one other communication resource and the subscriber domain 150-1 in response to detecting a change to configuration settings 121-1 as specified by communications 110-2.

FIG. 2 is an example diagram of subscriber information according to embodiments herein.

In one embodiment, the configuration management resource 140 maps unique identifier information in the received communications 110-2 to the appropriate portion of subscriber information 160 associated with subscriber domain 150-1. In other words, because it is known from which subscriber domain 150-1 (and potentially which particular resource in subscriber domain 150-1) originated the communications 110-2 such as based on network address information in received communications 110-2, the configuration management resource 140 is able to identify specific portion (subscriber information 160-1) of subscriber information 160 that corresponds to subscriber domain 150-1.

In this example embodiment, the subscriber information 160-1 associated with subscriber domain 150-1 indicates that: i) the subscriber domain 150-1 (such as a home residence, business address, etc.) is located at address LOCATION #1, ii) that user 108-1 is the head of household subscriber associated with subscriber domain 150-1, iii) that subscriber domain 150-1 is assigned account #15523456-12, that head of household user 108-1 subscribes to service A (such as cable television), service B (such as Internet access), service D (such as WiFi™ anywhere capability), and service E (such as TV anywhere), iv) that configuration settings associated with subscriber domain are stored in configuration information 170-1, etc.

In this example embodiment, the configuration management resource 140 maps the received communications 110-2 to the appropriate configuration information 170-1 associated with subscriber domain 150-1. As further discussed below, among other things, the configuration management resource 140 utilizes the configuration information 170-1 to identify one or more other communication resources associated with wireless access point 105-1 whose corresponding configuration settings are to be updated based on a change of the configuration settings 121-1 as previously discussed.

In a similar manner, note that the configuration management resource 140 is able to map communications received from any of the subscriber domains to corresponding configuration information as indicated by subscriber information 160. For example, in response to receiving communications from subscriber domain 150-2, the configuration management resource 140 is able to map the received communications to configuration information 170-2 associated with subscriber domain 150-2.

Figure 3:
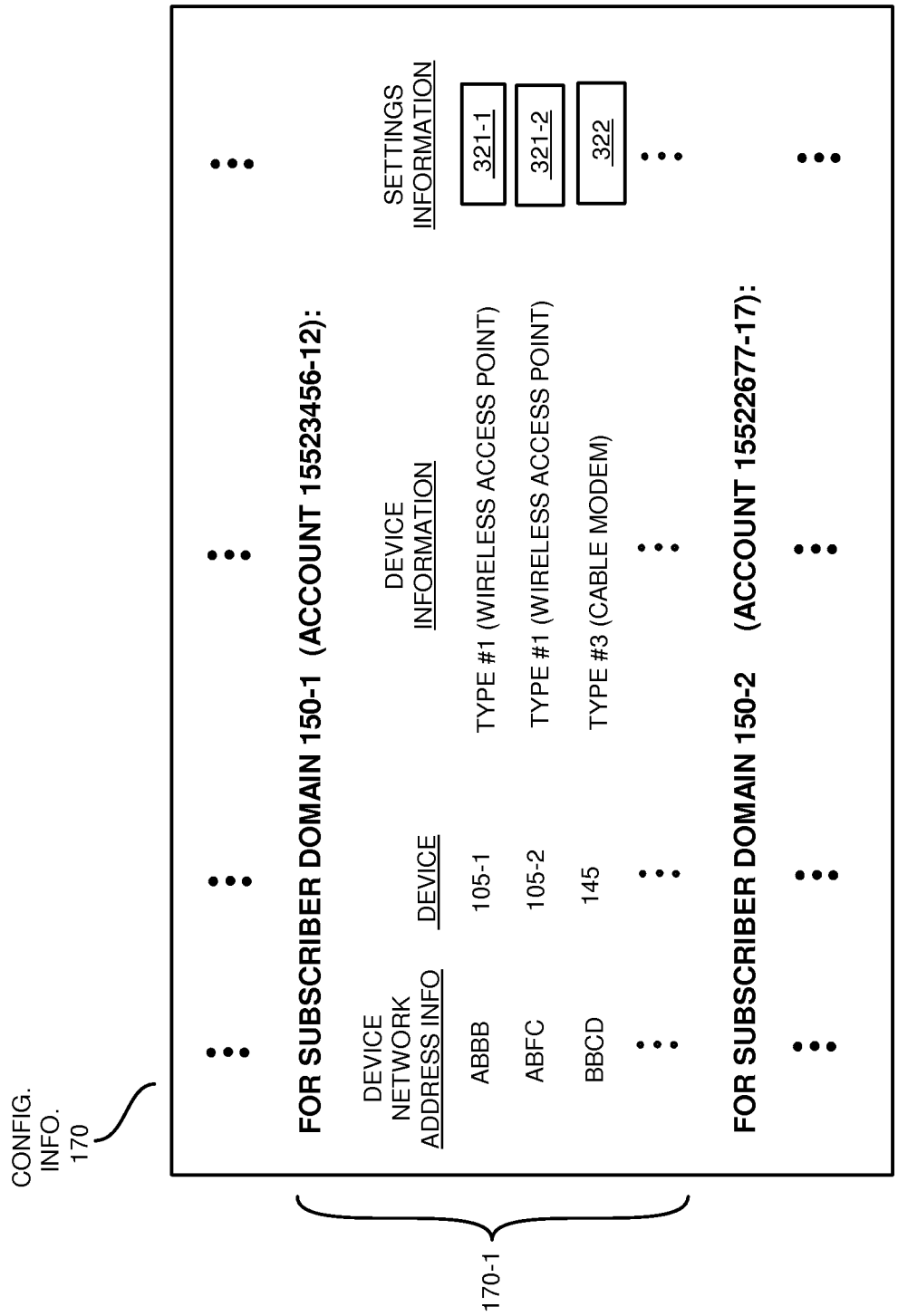
FIG. 3 is an example diagram of configuration information associated with corresponding subscribers according to embodiments herein.

FIG. 3 is an example diagram of configuration information associated with a respective subscriber domain according to embodiments herein.

As previously discussed, the subscriber information 160 associated with subscriber domain 150-1 indicated that configuration information 170-1 pertains to and specify settings associated with subscriber domain 150-1.

Subsequent to identifying that configuration information 170-1 pertains to subscriber domain 150-1, and in response to receiving notification from communications 110-2 that configuration settings 121-1 have been updated, the configuration management resource 140 processes the configuration information 170-1 associated with subscriber domain 150-1 to identify a presence of a configuration of different types of communication resources in the subscriber domain 150-1. In this example embodiment, the configuration management resource 140 processes the communications 110-2 to identify that the new configuration settings as specified by communications 110-2 were applied to wireless access point 105-1.

In one embodiment, configuration settings information 321-1 represents a copy of the configuration settings associated with resources in subscriber domain 150-1. Because communications 110-2 indicate a change to configuration settings 121-1, the configuration management resource 140 updates corresponding settings information 321-1 to reflect the change associated with configuration settings 121-1 and corresponding wireless access point 105-1. Thus, in one embodiment, the configuration manager resource 140 registers the new configuration settings as specified by the communications 110-2 as being associated with the first wireless access point 105-1 in the subscriber domain 150-1. In this manner, the remotely stored settings information 321-1 associated with wireless access point 105-1 can be a backup or replica of configuration settings 121-1.

Additionally, as previously discussed, the configuration management resource 140 identifies other communication resources associated with the resource whose configuration settings are to be modified based on modification of configuration settings as specified by communications 110-2.

In this example embodiment, via processing of configuration information 170-1, the configuration management resource 140 identifies that subscriber domain 150-1 further includes wireless access point 105-2, which is part of the wireless network including wireless access point 105-1. In furtherance of synchronizing settings associated with the first wireless access point 105-1 and wireless access point 105-2 because they are part of the same wireless network, the configuration management resource 140 initiates updating one or more configuration settings (such as its SSID name) associated with wireless access point 105-2 as further shown in FIG. 4.

Figure 4:
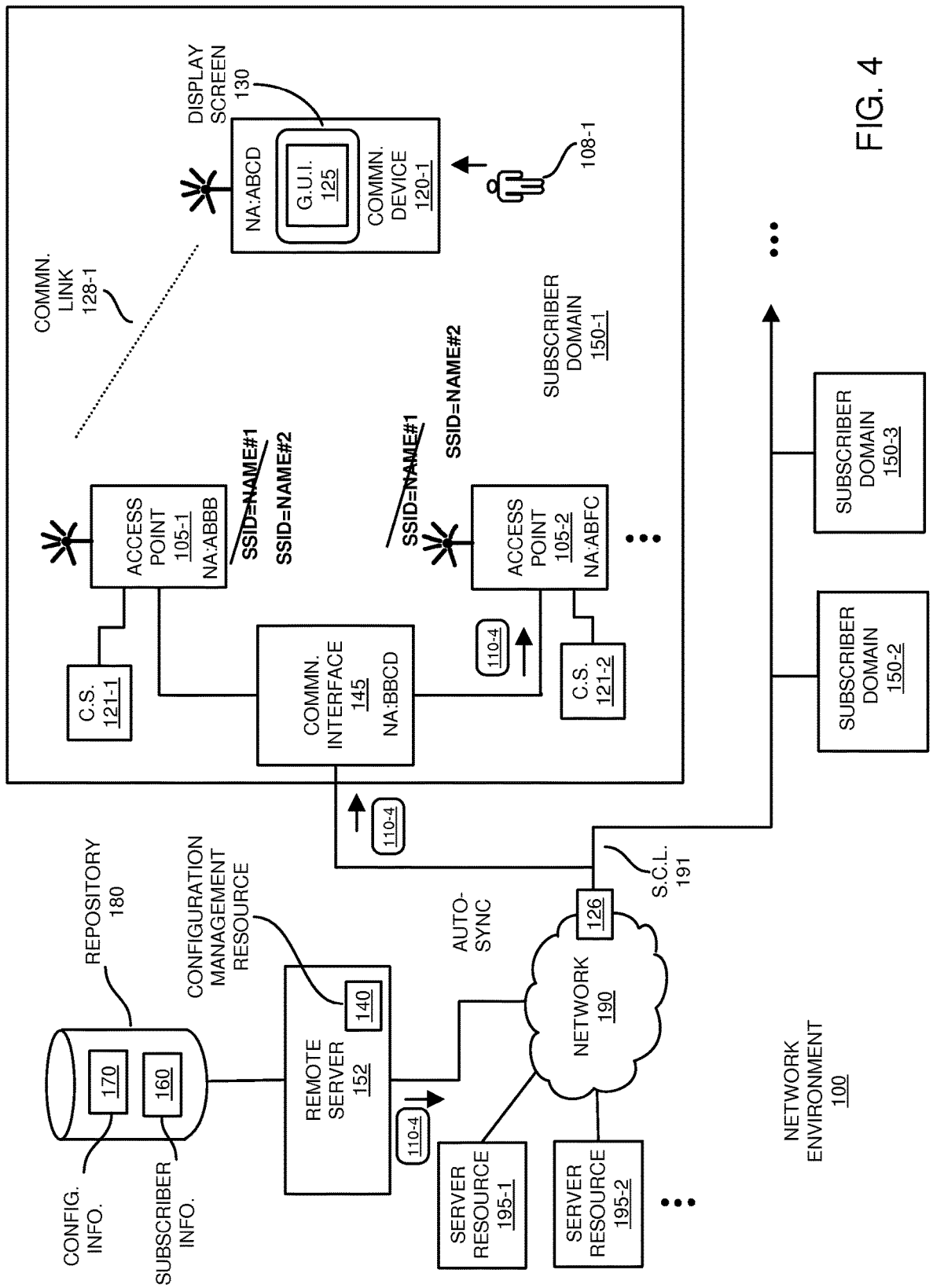
FIG. 4 is an example diagram illustrating auto-synchronization of configuration settings according to embodiments herein.

More specifically, FIG. 4 is an example diagram further illustrating auto-synchronization of configuration settings according to embodiments herein.

As shown, in response to detecting that configuration settings 121-1 have been modified as indicated by communications 110-2, the configuration management resource 140 generates and transmits communications 110-4 over network 190, through shared communication link 191 and communication interface 145 to wireless access point 105-2. The communications 110-4 originated by the configuration management resource 140 notify the wireless access point 105-2 of the corresponding configuration settings that are to be updated such that the wireless access point 105-2 is synchronized with the modifications of configuration settings 121-1 associated with wireless access point 105-1.

In accordance with modification instructions such as one or more update commands in the communications 110-4, the wireless access point 105-2 modifies its corresponding configuration settings 121-2 (e.g., the SSID name associated with wireless access point is updated to be NAME #2), to be synchronized with respect to the new configuration settings applied to wireless access point 105-1.

Thus, synchronizing configuration settings can include transmitting a copy of the new configuration setting applied to the wireless access point 105-1 from configuration management resource 140 over network 190, shared communication link 191, and communication interface 145 to the second wireless access point 105-2. In one embodiment, the configuration management resource 140 generates the communications 110-4 to specify the particular network address (such as network address ABFC) to which the communications 110-4 are directed.

In furtherance of this particular example, in accordance with the instructions set forth in the communications 110-4, the wireless access point 105-2 updates its configuration settings 121-2 to indicate that the SSID name associated with the wireless access point 105-2 has been changed from NAME #1 to NAME #2.

Thus, in response to detecting a change to configuration settings associated with a respective first communication resource in a subscriber domain, the configuration management resource 140 automatically synchronizes one or more other communication resources in the subscriber domain 150-1 in accordance with settings applied to the first communication resource.

Note that auto-synchronization according to embodiments herein is not limited to synchronizing network names. For example, the user 108-1 can specify to make modifications to other types of configuration settings information such as password information, security mode information, channel setting information, etc.

In a similar manner as previously discussed, any changes to respective configuration settings (e.g., password information, security mode information, channel setting information, etc.) of communication resources in subscriber domain 150-1 are forwarded over shared communication link 191 to configuration management resource 140. The configuration management resource 140 processes the received communications indicating the updated configuration settings to identify one or more other communication resources whose configuration settings are to be updated.

Note that automatic configuration of configuration settings is not limited to setting the configuration settings associated with each of multiple different communication resources to the exact same settings. In one embodiment, the user 108-1 can initiate changing a setting of particular channels used by the wireless access point 105-2 to communicate in subscriber domain 150-1. In a manner as previously discussed, the wireless access point 105-2 notifies configuration management resource 140 of the change to the wireless channel setting. In response to receiving the notification of modifying configuration settings associated with the wireless access point 105-2, the configuration management resource 140 initiates communications over shared communication link 191 and communication interface 145 to change wireless channel settings associated with access point 105-1. Because of the possibility of interference if both wireless access points 105 use the same wireless vacation channels, instead of choosing the exact same channels that were selected for use by the wireless access point 105-2, the configuration management resource selects complementary wireless channels (such as channels that use a different carrier frequency) that are not used by the wireless access point 105-2. The configuration management resource 140 notifies the wireless access point 105-1 to use the complementary wireless channels.

Thus, in a specific instance, the user 108-1 may configure the wireless access point 105-2 to use channel #1. In such an instance, to synchronize the wireless access point 105, the configuration management resource 140 notifies the wireless access point 105-1 to use non-interfering channel #2.

Figure 5:
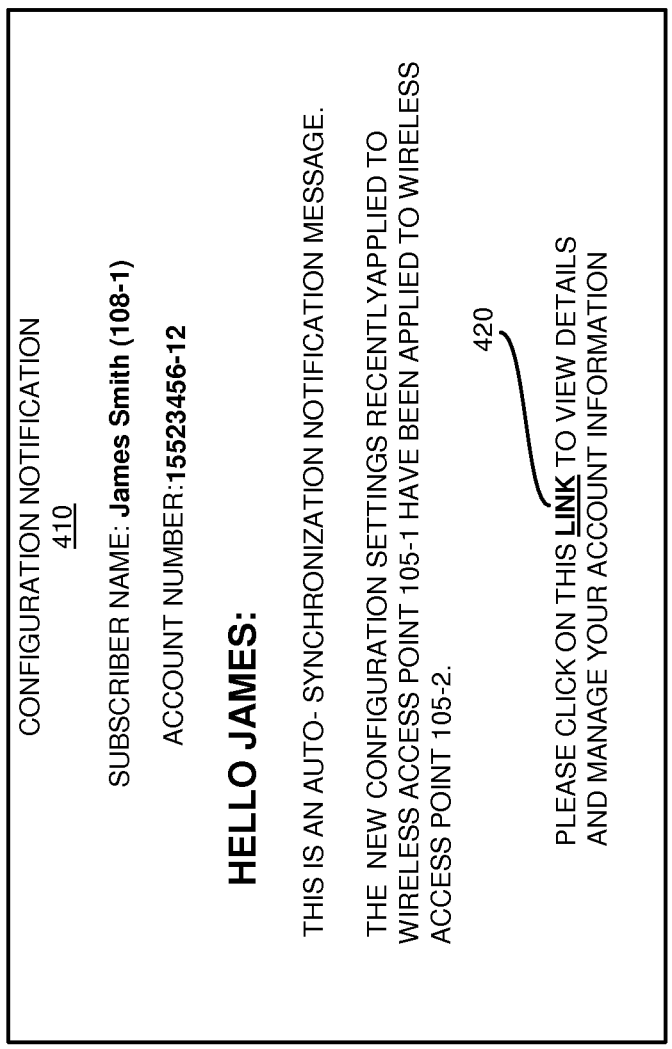
FIG. 5 is an example diagram illustrating a configuration notification indicating auto-synchronization according to embodiments herein.

FIG. 5 is an example diagram illustrating a configuration notification indicating auto-synchronization according to embodiments herein.

In one embodiment, subsequent to updating configuration settings 121-2 associated with wireless access point 105-2, any of one or more suitable resources (such as configuration management resource 140, wireless access point 105-1, communication interface 145, wireless access point 105-2, etc.) can be configured to notify the user 108-1, via configuration notification 410, that the configuration settings applied to a particular communication resource such as wireless access point 105-1 have been used as a basis to update at least one other communication resource in the subscriber domain 150-1. To view further details associated with the update, the respective user 108 can click on link 420.

In this particular example, the configuration management resource 140 or other suitable resource transmits configuration notification 410 to user 108-1 for display on display screen 130. The user 108-1 can click on link 420. Clicking on link 420 will cause the graphical user interface 125 to display further details such as that the new configuration settings (NAME #2) initially applied to wireless access point 105-1 also has been applied to wireless access point 105-2.

Figure 6:
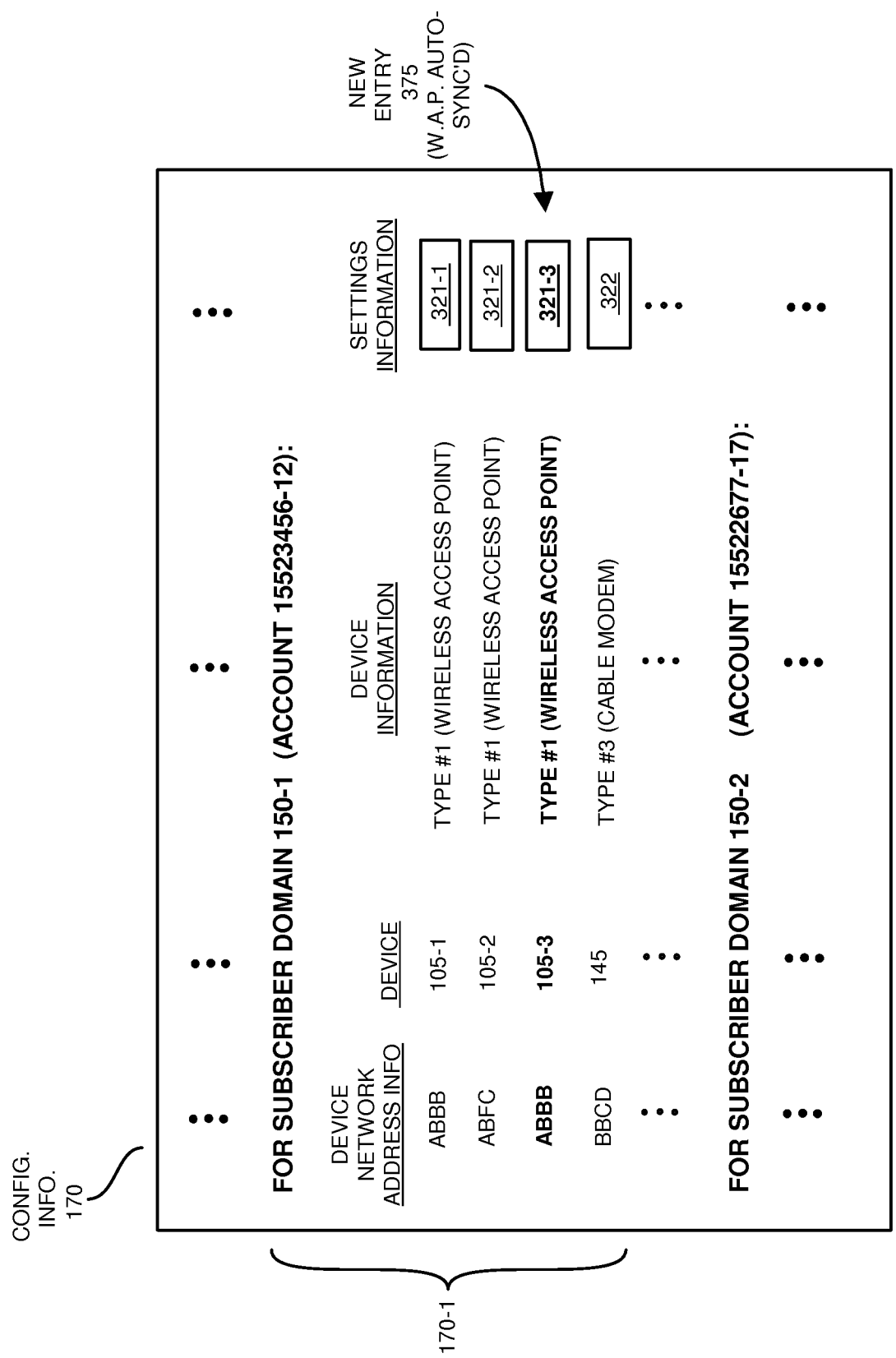
FIG. 6 and example diagram illustrating updating of configuration information associated with a subscriber domain according to embodiments herein.

FIG. 6 and example diagram illustrating updating of configuration information associated with a subscriber domain according to embodiments herein.

In accordance with yet further embodiments, the subscriber domain 150-1 can be updated to include another communication resource such as a third wireless access point. In one embodiment, in response to detecting installation of a new wireless access point such as a third wireless access point in subscriber domain 150-1, the configuration management resource 140 can be configured to utilize stored settings associated with another wireless access point in the subscriber domain 150-1 to configure the new wireless access point.

More specifically, assume that the user 108-1 or other party such as a technician employed by the cable network service provider installs an additional wireless access point 105-3 in subscriber domain 150-1. The installer provides connectivity such as a hardwired link between the wireless access point 105-3 (such as assigned network address ABBB) and communication interface 145.

Initially, assume that the new wireless access point 105-3 is not configured and needs to be synchronized with the existing wireless access points 105-1 and 105-2 such that the combination of wireless access points 105-1, 105-2, and 105-3 are part of the same wireless network in subscriber domain 150-1.

In one embodiment, upon installation of wireless access point 105-3, the wireless access point 105-3 communicates through communication interface 145 over network 190 to configuration management resource 140. In a similar manner as previously discussed, such as using network address information associated with the received communications from the wireless access point 105-3, the configuration manager resource 140 is able to determine that the wireless access point 105-3 is being newly installed in subscriber domain 150-1. To synchronize settings of the new wireless access point 105-3, the configuration management resource 140 accesses the subscriber information 160 and corresponding configuration information 170-1 associated with the subscriber domain 150-1 to determine appropriate settings to apply to the new wireless access point 105-3.

In one embodiment, the configuration manager resource 140 accesses configuration settings 321-1 (associated with wireless access point 105-1) and/or configuration settings 321-2 (associated with wireless access point 105-2) from repository 180. The configuration management resource 140 then communicates settings such as an appropriate SSID name, password information, wireless security settings, etc., retrieved or derived from the configuration settings 321-1 and/or 321-2 to the newly installed wireless access point 105-3. The newly installed wireless access point 105-3 configures itself using the configuration settings received from the configuration management resource 140.

Accordingly, the newly installed communication resource can be automatically configured in accordance with pre-existing configuration settings associated with other communication resources in the subscriber domain 150-1.

Figure 7:
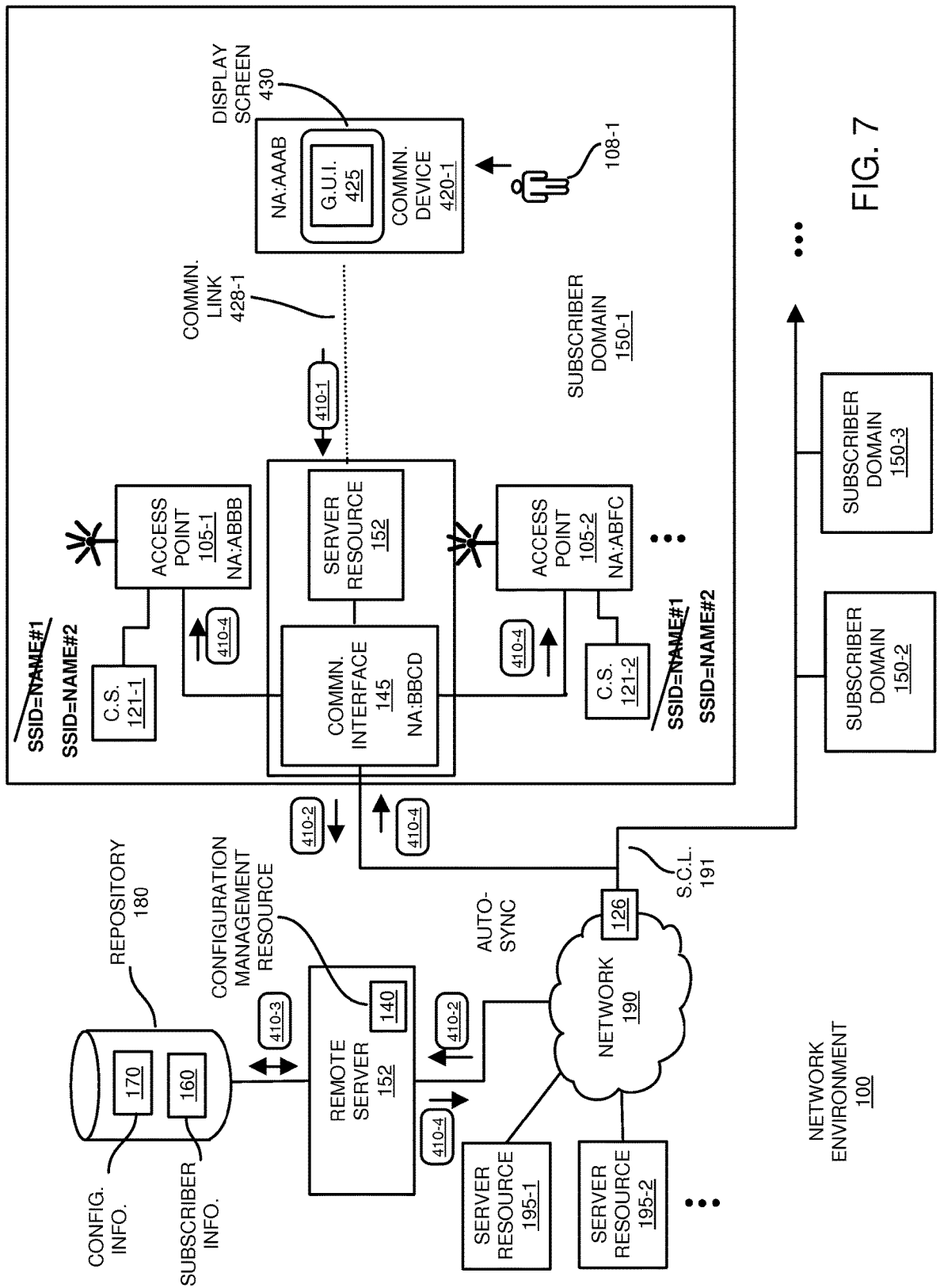
FIG. 7 is an example diagram illustrating an alternative manner in which to update configuration settings according to embodiments herein.

FIG. 7 is an example diagram illustrating an alternative manner in which to update configuration settings according to embodiments herein.

In this example embodiment, the user 108-1 operates communication device 420-1 such as a computer to communicate with server resource 752. Assume in this example embodiment that the user 108-1 operates the graphical user interface 425 (such as a browser) displayed on display screen 430 of communication device 420-1 to retrieve a management webpage from server resource 752. Via communications over communication link 428-1, the server resource 752 populates graphical user interface 425 on display screen 430 with the requested management webpage. The management webpage enables the respective user 108-1 to modify settings associated with any of one or more resources in subscriber domain 150-1.

Assume in this example embodiment that the user 108-1, via graphical user interface 425, provides a new configuration setting for application to both a first communication resource and a second communication resource in the subscriber domain 150-1. More specifically, assume that the user 108-1 initiates a change of a respective SSID name associated with one or more of the wireless access points 105 in subscriber domain 150-1. As previously discussed, both wireless access point 105-1 and wireless access point 105-2 are part of the same wireless network and initially have the same SSID name of NAME #1.

In this example embodiment, the user 108-1 provides an input command (communications 410-1) to communication device 420-1 to change the name of the wireless network from SSID name of NAME #1 to NAME #2. In accordance of the input command, via communications 410-1, the communication device 420-1 notifies server resource 752 of the change of configuration settings. Server resource 752 forwards the requested change to configuration settings as communications 410-2 to configuration management resource 140. Via communications 410-3, the configuration management resource 140 accesses the subscriber information 160 and configuration information 170 in repository 180 to update configuration settings associated with subscriber domain 150-1. Further, a similar manner as previously discussed, via communications 410-4, the configuration management resource 140 communicates with both wireless access point 105-1 and wireless access point 105-2, initiating a change of the name of NAME #1 and NAME #2 in accordance with the request received from user 108-1. In accordance with the instructions in the communications 410-4, the wireless access point 105-1 updates configuration settings 121-1 to indicate that the new name is NAME #2. Similarly, in accordance with the instructions in the communications 410-4, the wireless access point 105-2 updates configuration settings 121-2 to indicate that its new name is NAME #2.

Figure 8:
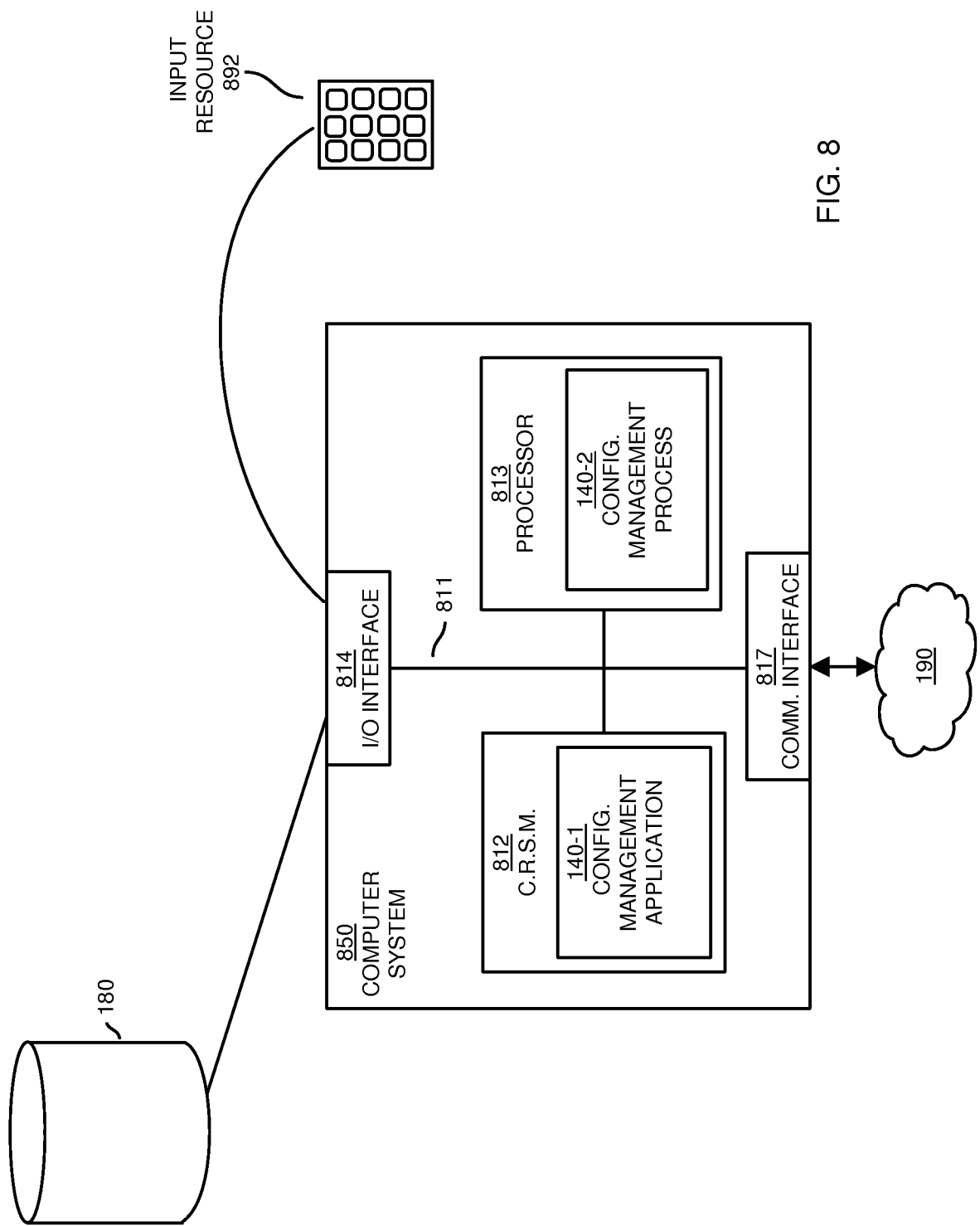
FIG. 8 is a diagram illustrating an example computer architecture in which to execute any functionality according to embodiments herein.

FIG. 8 is an example block diagram of a computer device for implementing any of the operations as discussed herein according to embodiments herein.

In one embodiment, one or more computers implement the configuration management resource 140 (such as an auto-configuration server) and corresponding operations as discussed herein.

As shown, computer system 850 of the present example includes an interconnect 811, a processor 813 (such as one or more processor devices, computer processor hardware, etc.), computer readable storage medium 812 (such as hardware storage to store instructions, data, information, etc.), I/O interface 814, and communications interface 817.

Interconnect 811 provides connectivity amongst processor 813, computer readable storage media 812, I/O interface 814, and communication interface 817.

I/O interface 814 provides connectivity to a repository 180 and, if present, other devices such as a playback device, display screen, input resource 892, a computer mouse, etc.

Computer readable storage medium 812 (such as a non-transitory hardware medium) can be any suitable hardware storage resource or device such as memory, optical storage, hard drive, rotating disk, etc. In one embodiment, the computer readable storage medium 812 stores instructions executed by processor 813.

Communications interface 817 enables the computer system 850 and processor 813 to communicate over a resource such as network 190 to retrieve information from remote sources and communicate with other computers. I/O interface 814 enables processor 813 executing configuration management application 140-1 to retrieve stored information such as from repository 180.

As shown, computer readable storage media 812 is encoded with configuration management application 140-1 (e.g., software, firmware, etc.) executed by processor 813 (hardware). Configuration management application 140-1 can be configured to include instructions to implement any of the operations as discussed herein.

During operation of one embodiment, processor 813 (e.g., computer processor hardware) accesses computer readable storage media 812 via the use of interconnect 811 in order to launch, run, execute, interpret or otherwise perform the instructions in the configuration management application 140-1 stored on computer readable storage medium 812.

Execution of the configuration management application 140-1 produces processing functionality such as configuration management process 140-2 in processor 813. In other words, the configuration management process 140-2 associated with processor 813 represents one or more aspects of executing configuration management application 140-1 within or upon the processor 813 in the computer system 850.

Those skilled in the art will understand that the computer system 850 can include other processes and/or software and hardware components, such as an operating system that controls allocation and use of hardware resources to execute configuration management application 140-1.

In accordance with different embodiments, note that computer system may be any of various types of devices, including, but not limited to, a wireless access point, a mobile computer, a personal computer system, a wireless device, base station, phone device, desktop computer, laptop, notebook, netbook computer, mainframe computer system, handheld computer, workstation, network computer, application server, storage device, a consumer electronics device such as a camera, camcorder, set top box, mobile device, video game console, handheld video game device, a peripheral device such as a switch, modem, router, or in general any type of computing or electronic device. The computer system 850 and its parts may reside at any of one or more locations or can be included in any suitable one or more resource in network environment 100 to implement functionality as discussed herein.

Functionality supported by the different resources will now be discussed via flowcharts in FIGS. 9 and 10. Note that the steps in the flowcharts below can be executed in any suitable order.

Figure 9:
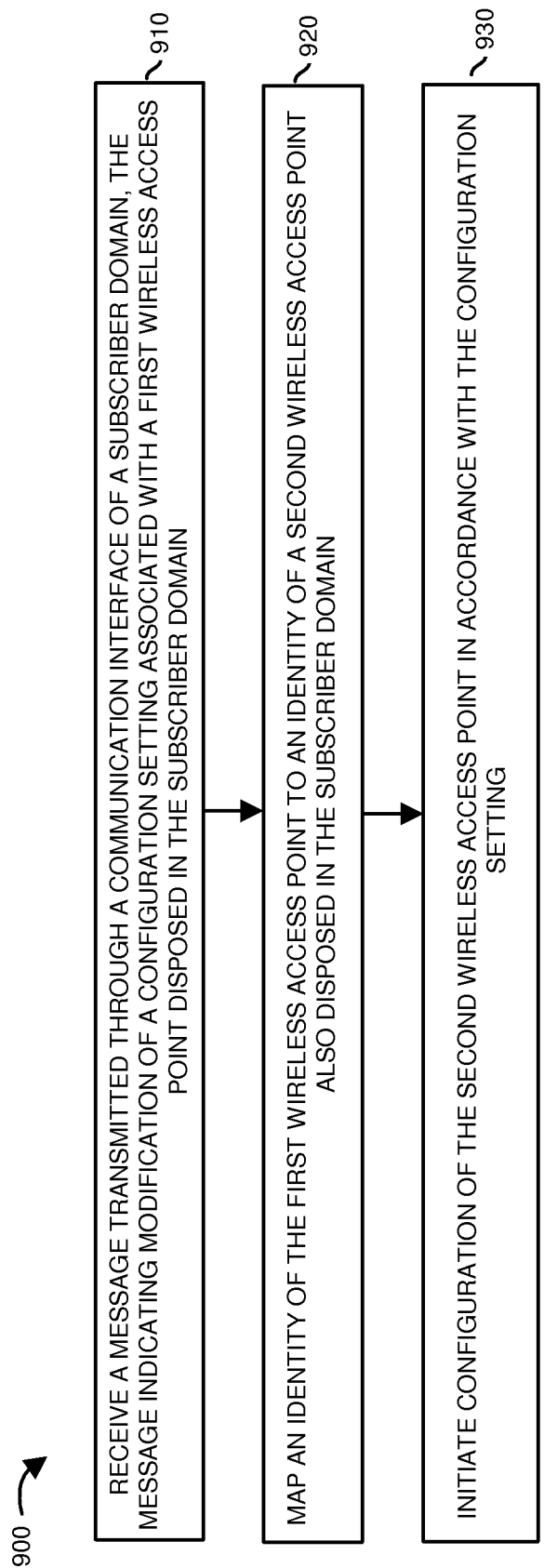
FIGS. 9 and 10 are example diagrams illustrating methods according to embodiments herein.

FIG. 9 is a flowchart 900 illustrating an example method according to embodiments. Note that there will be some overlap with respect to concepts as discussed above.

In processing block 910, the configuration management resource 140 receives a communication (such as via communications 110-2) transmitted through a communication interface 145 of a subscriber domain 150-1. The communication indicates occurrence of a modification of a configuration setting associated with a first wireless access point 105-1 disposed in the subscriber domain 150-1.

In processing block 920, the configuration management resource 140 maps an identity of the first wireless access point 105-1 to an identity of a second wireless access point 105-2, which is also disposed in the subscriber domain. In one embodiment, mapping an identity of the first wireless access point 105-1 to the identity of the second wireless access point 105-2 includes: processing the received message (such as communications 110-2) to retrieve network address information; utilizing the network address information in the communications 110-2 to identify that the message (medications 110-2) was transmitted through the communication interface 145 of the subscriber domain 150-1; and accessing configuration information 170-1 associated with a subscriber domain 150-1. The configuration information 170-1 indicates that the second wireless access point 105-2 is disposed in the subscriber domain 150-1 along with wireless access point 105-1. The configuration information 170-1 can further indicate that settings associated with the wireless access point 105-1 are to be synchronized with settings of the wireless access point 105-2.

In processing block 930, the configuration management resource 140 initiates configuration of the second wireless access point 105-2 in accordance with the configuration setting applied to the first wireless access point 105-1.

Figure 10:
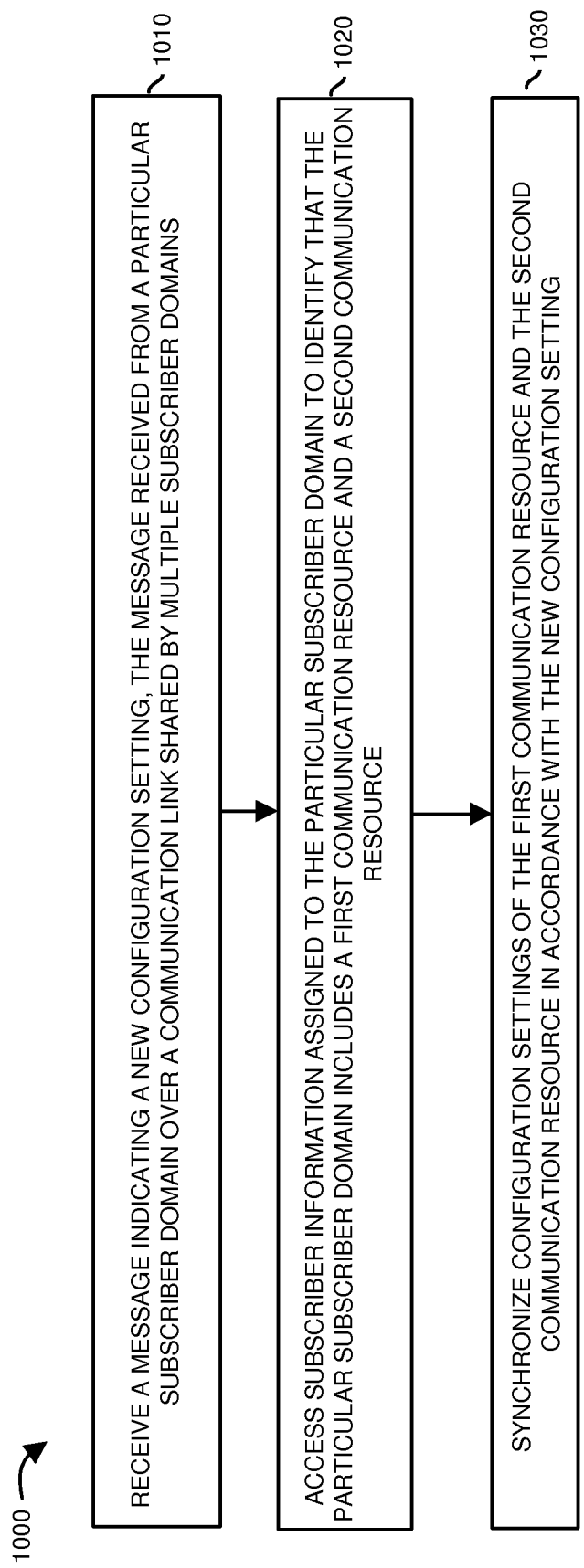

FIG. 10 is a flowchart 1000 illustrating an example method according to embodiments. Note that there will be some overlap with respect to concepts as discussed above.

In processing block 1010, the configuration management resource 140 receives a communication (such as via communications 110-2) indicating a new configuration setting. In one non-limiting example embodiment, a respective user 108-1 applies the new configuration setting to a first wireless access point 105-1 in the subscriber domain 150-1. The configuration management resource 140 receives the communication from subscriber domain 150-1 over a communication link 191 shared by multiple subscriber domains to access network 190.

In processing block 1020, the configuration manager resource 140 accesses subscriber information 160 assigned to the subscriber domain 150-1. The configuration management resource 140 maps the subscriber information to configuration information associated with the subscriber domain 150-1. Via the configuration information 170-1 associated with subscriber domain 150-1, the configuration management resource 140 identifies that the particular subscriber domain 150-1 includes a first communication resource (such as a first wireless access point 105-1) and a second communication resource (such as a second wireless access point 105-2).

In processing block 1030, the configuration management resource 140 synchronizes configuration settings 121-1 of the first communication resource and configuration settings 121-2 of the second communication resource in accordance with the new configuration setting.

Note again that techniques herein are well suited to automatically synchronize configuration settings of communication resources in a subscriber domain. However, it should be noted that embodiments herein are not limited to use in such applications and that the techniques discussed herein are well suited for other applications as well.

Based on the description set forth herein, numerous specific details have been set forth to provide a thorough understanding of claimed subject matter. However, it will be understood by those skilled in the art that claimed subject matter may be practiced without these specific details. In other instances, methods, apparatuses, systems, etc., that would be known by one of ordinary skill have not been described in detail so as not to obscure claimed subject matter. Some portions of the detailed description have been presented in terms of algorithms or symbolic representations of operations on data bits or binary digital signals stored within a computing system memory, such as a computer memory. These algorithmic descriptions or representations are examples of techniques used by those of ordinary skill in the data processing arts to convey the substance of their work to others skilled in the art. An algorithm as described herein, and generally, is considered to be a self-consistent sequence of operations or similar processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has been convenient at times, principally for reasons of common usage, to refer to such signals as bits, data, values, elements, symbols, characters, terms, numbers, numerals or the like. It should be understood, however, that all of these and similar terms are to be associated with appropriate physical quantities and are merely convenient labels. Unless specifically stated otherwise, as apparent from the following discussion, it is appreciated that throughout this specification discussions utilizing terms such as "processing," "computing," "calculating," "determining" or the like refer to actions or processes of a computing platform, such as a computer or a similar electronic computing device, that manipulates or transforms data represented as physical electronic or magnetic quantities within memories, registers, or other information storage devices, transmission devices, or display devices of the computing platform.

While one or more inventions have been particularly shown and described with references to preferred embodiments thereof, it will be understood by those skilled in the art that various changes in form and details may be made therein without departing from the spirit and scope of the present application as defined by the appended claims. Such variations are intended to be covered by the scope of this present application. As such, the foregoing description of embodiments of the present application is not intended to be limiting. Rather, any limitations to the invention are presented in the following claims.

We claim:

1. A method comprising:
    receiving a communication indicating a new configuration setting, the communication received from a particular subscriber domain over a communication link shared by multiple subscriber domains;
    in response to receiving the communication, accessing subscriber information assigned to the particular subscriber domain;
    via the subscriber information, identifying that the particular subscriber domain includes a first communication device and a second communication device, the first communication device being a first wireless access point, the second communication device being a second wireless access point; and
    synchronizing configuration settings of the first communication device and the second communication device in accordance with the new configuration setting;
    wherein synchronizing the configuration settings includes applying the new configuration setting to both the first communication device and the second communication device; and
    wherein applying the new configuration setting to both the first communication device and the second communication device includes: communicating the new configuration setting over the shared communication link to both the first communication device and the second communication device; and
    wherein synchronizing configuration settings of the first communication device and the second communication device includes: replacing use of a current version of configuration settings of the first communication device with use of the new configuration setting; and
    replacing use of a current version of configuration settings of the second communication device with use of the new configuration setting.

2. The method as in claim 1 further comprising:
    via analyzing the received communication, identifying that the communication was received from the particular subscriber domain.

3. The method as in claim 2, wherein analyzing the received communication comprises:
    obtaining network address information from the received communication; and
    via the network address information, identifying that the communication was received from the particular subscriber domain.

4. The method as in claim 3, wherein the communication is received from the first communication device in the subscriber domain, the new configuration setting applied to modify settings of the first communication device; and
    wherein synchronizing configuration settings includes transmitting the new configuration setting to the second communication device.

5. The method as in claim 3 further comprising:
    receiving the communication through a communication interface disposed in the subscriber domain, each of the first communication device and the second communication device being a respective wireless access point providing mobile communication devices in the subscriber domain wireless access to a remote network through the communication interface.

6. The method as in claim 1 further comprising:
    receiving the communication as input to a browser application executed by a user controlling the configuration settings in the particular subscriber domain, the user providing the new configuration setting for application to both the first communication device and the second communication device.

7. The method as in claim 1, wherein the communication indicating the new configuration setting is received over the shared communication link by a remote server disparately located with respect to the particular subscriber domain, the remote server operable to control operation of the first communication device and the second communication device.

8. The method as in claim 1, wherein synchronizing configuration settings of the first communication device and the second communication device includes:
    communicating a command including the new configuration setting over the shared communication link to both the first communication device and the second communication device.

9. The method as in claim 8, wherein communication of the command including the new configuration setting over the shared communication link to the first communication device prompts the first communication device to replace an old configuration setting of the first communication device with the new configuration setting; and
    wherein communication of the command including the new configuration setting over the shared communication link to the second communication device prompts the second communication device to replace an old configuration setting of the second communication device with the new configuration setting.

10. The method as in claim 1, wherein the subscriber information assigned to the particular subscriber domain is accessed from a repository that is disparately located with respect to the particular subscriber domain.

11. The method as in claim 1, wherein the new configuration setting is different than a current configuration setting of the first communication device and the second communication device.

12. The method as in claim 1, wherein the first communication device and the second communication device are operable to communicate through a communication interface of the subscriber domain to provide a mobile communication device in the subscriber domain access to a remote network through the shared communication link; and
wherein synchronizing further comprises: transmitting a command over the shared communication link through the communication interface of the particular subscriber domain to the first communication device and the second communication device, the command including the new configuration setting.

13. The method as in claim 1, wherein receiving the communication comprises receiving the communication from a web browser executing on a computer device operated by a user in the particular subscriber domain.

14. The method as in claim 1, wherein the communication indicates that the new configuration setting was applied to the first communication device;
wherein the first wireless access point is operable to provide a communication device in the particular subscriber domain access to a remote network over the shared communication link; and
wherein the second wireless access point is operable to provide the communication device in the particular subscriber domain access to the remote network over the shared communication link.

15. The method as in claim 1, wherein the communication indicating the new configuration setting is received over the shared communication link by a remote server disparately located with respect to the particular subscriber domain, the remote server operable to control operation of the first communication device and the second communication device.

16. The method as in claim 15, wherein synchronizing the configuration settings includes:
detecting that the new configuration setting was applied to the first communication device;
mapping the first communication device to the second communication device; and
applying the new configuration setting to the second communication device.

17. The method as in claim 16, wherein applying the new configuration setting to the second communication device includes: communicating the new configuration setting through the shared communication link to the second communication device.

18. The method as in claim 4, wherein the configuration setting is a wireless access point name assigned to the first communication device; and
wherein transmission of the new configuration setting to the second communication device sets a name of the second communication device to the wireless access point name assigned to the first communication device.

19. A computer system comprising:
computer processor hardware; and
a hardware storage resource coupled to the computer processor hardware, the hardware storage resource storing instructions that, when executed by the computer processor hardware, causes the computer processor hardware to:
receive a communication indicating a new configuration setting, the communication received from a particular subscriber domain over a communication link shared by multiple subscriber domains;
in response to receiving the communication, access subscriber information assigned to the particular subscriber domain;
via the subscriber information, identifying that the particular subscriber domain includes a first communication device and a second communication device; and
synchronize configuration settings of the first communication device and the second communication device in accordance with the new configuration setting;
wherein synchronizing the configuration settings includes applying the new configuration setting to both the first communication device and the second communication device; and
wherein applying the new configuration setting to both the first communication device and the second communication device includes: communicating the new configuration setting over the shared communication link to both the first communication device and the second communication device; and
wherein synchronizing configuration settings of the first communication device and the second communication device results in: replacing use of a current version of configuration settings of the first communication device with use of the new configuration setting; and replacing use of a current version of configuration settings of the second communication device with use of the new configuration setting.

20. The computer system as in claim 19, wherein the computer processor hardware is further operable to:
analyze the received communication to identify the particular subscriber domain amongst the multiple subscriber domains.

21. The computer system as in claim 20, wherein the computer processor hardware is further operable to:
obtain network address information from the received communication; and
via the network address information, identify that the communication was received from the particular subscriber domain.

22. The computer system as in claim 21, wherein the communication is received from the first communication device in the subscriber domain, the new configuration setting applied to modify settings of the first communication device, the first communication device being a first wireless access point disposed in the subscriber domain; and
wherein the computer processor hardware is further operable to transmit the new configuration setting to the second communication device, the second communication device being a second wireless access point.

23. The computer system as in claim 21, wherein the computer processor hardware is further operable to:
receive the communication through a communication interface disposed in the subscriber domain, each of the first communication device and the second communication device providing mobile communication devices in the subscriber domain wireless access to a remote network through the communication interface.

24. The computer system as in claim 19, wherein the computer processor hardware is further operable to:
receive the communication as input to a browser application executed by a user controlling the configuration settings in the particular subscriber domain, the user providing the new configuration setting for application to both the first communication device and the second communication device.

25. A system comprising:
a first communication device;
a second communication device, the first communication device and the second communication device operated in a subscriber domain;
a controller operable to:
receive a communication indicating a new configuration setting to be implemented in the subscriber domain, the communication received over a communication link;
in response to receiving the communication, access subscriber information assigned to the subscriber domain;
via the subscriber information, identify that the subscriber domain includes the second communication device; and
wherein the controller is further operative to synchronize configuration settings via application of the new configuration setting to both the first communication device and the second communication device;
wherein application of the new configuration setting to both the first communication device and the second communication device includes: communication of the new configuration setting over the communication link to both the first communication device and the second communication device; and
wherein application of the new configuration setting results in: replacement of using a current version of configuration settings of the first communication device with using the new configuration setting; and replacement of using a current version of configuration settings of the second communication device with using the new configuration setting.

26. The system as in claim 25, wherein the controller is operable to communicate the new configuration setting to the second communication device in response to detecting that the new configuration setting was applied to the first communication device.

27. The system as in claim 25, wherein the new configuration setting is applied by a user in the subscriber domain to the first communication device.

28. The system as in claim 25, wherein the controller is further operable to communicate the new configuration setting to the second communication device to change a corresponding setting of the second communication device in response to application of the new configuration setting to the first communication device.

29. The system as in claim 25, wherein the controller is further operable to:
detect that the new configuration setting was applied to the first communication device;
map the first communication device to the second communication device; and
generate a command, execution of the command configuring the second communication device with the new configuration setting.

30. The system as in claim 25, wherein the controller is further operable to:
synchronize configuration settings of the first communication device and the second communication device via application of the new configuration setting to the second communication device.

31. The system as in claim 25, wherein the controller is further operable to:
process the received communication to retrieve network address information;
via the network address information, identify that the communication was transmitted through a communication interface of the subscriber domain in which the first communication device resides; and
map an identity of the first communication device to the second communication device.

32. The system as in claim 25, wherein the first communication device is a first wireless access point operated in the subscriber domain; and
wherein the second communication device is a second wireless access point operated in the subscriber domain.

33. The system as in claim 32, wherein the new configuration setting is a new name initially applied to the first wireless access point operated in the subscriber domain; and
wherein the controller is further operable to apply the new configuration setting to the second wireless access point in response to application of the new name to the first wireless access point.

34. The system as in claim 25, wherein the new configuration setting is a new name initially applied to the first communication device, application of the new name to the second communication device indicating that the first communication device and the second communication device are part of a common network.

* * * * *